United States Patent [19]

Clare et al.

[11] Patent Number: 4,729,900
[45] Date of Patent: Mar. 8, 1988

[54] FOAM-STABILIZED MALT BEVERAGE

[75] Inventors: Kenneth Clare, Vista; Margaret A. Lawson; Walter Bryden, both of San Diego, all of Calif.

[73] Assignee: Merck & Co., Inc., Rahway, N.J.

[21] Appl. No.: 855,052

[22] Filed: Apr. 22, 1986

[51] Int. Cl.$^4$ ............................................. C12C 5/02
[52] U.S. Cl. ............................. 426/329; 426/330.4; 426/592; 426/657
[58] Field of Search ............... 426/11, 569, 32, 12, 426/16, 28, 29, 61, 64, 321, 329, 330.3, 330.4, 330, 592, 600, 656, 657–658, 654, 661, 422, 423, 15; 435/93

[56] References Cited

U.S. PATENT DOCUMENTS

| | | | |
|---|---|---|---|
| 2,478,988 | 8/1949 | Wallerstein et al. | 426/329 |
| 2,547,988 | 4/1951 | Wallerstein et al. | 426/329 |
| 3,052,548 | 9/1962 | Nugey | 426/592 |
| 3,982,024 | 9/1976 | Oneto | 426/15 |

FOREIGN PATENT DOCUMENTS 0704035  2/1965  Canada ........................... 426/329

*Primary Examiner*—Raymond N. Jones
*Assistant Examiner*—Marianne M. Cintins
*Attorney, Agent, or Firm*—Gabriel Lopez; Hesna J. Pfeiffer

[57] ABSTRACT

A fermented malt beverage having improved foam stability and desirable lace, cling, and clarity is described. The beverage is stabilized by adding 5–400 ppm by weight of combined xanthan gum and a cold-water soluble protein.

18 Claims, No Drawings

FOAM-STABILIZED MALT BEVERAGE

BACKGROUND OF THE INVENTION

A number of malt beverages or beers will produce a relatively good foam immediately after pouring, but the foams so produced are not as persistent as is usually desired by the consumers of such products. In addition, consumers desire a beer possessing a foam that will "cling" to the insides of a glass or mug in an attractive "lacy" pattern. Lace and cling are difficult to achieve in the presence of slight contaminant levels of surfactants or detergents on the glassware, as occurs when beer mugs or glasses are handwashed and quickly rinsed prior to use. A further requirement is that the beer exhibit good clarity to the consumer, i.e., the absence of any noticeable "haze".

Propylene glycol alginate (PGA), heteropolysaccharide S-10 (see U.S. Pat. No. 3,966,976) and cellulose ether (see U.S. Pat. No. 3,669,00) are additives known to stabilize beer foam.

However, continuing research is being conducted in an effort to discover new polymers, additives, and polymer combinations which may be more economical and which can be utilized to impart improved foam stability, lace and clarity to fermented malt beverages while avoiding attendant "haze" levels.

Xanthan gum as an extender or thickener in the food industry is well described in the literature. Also well known in the art is the use of collagen hydrolysates, derived from animal skin, in the preparation of hair care preparation, shampoos and skin care preparations. Collagen derivatives have been used in the brewing process as fining agents. Further, gelatin hydrolysates are well known in the pharmaceutical industry as tablet excipients used in granulating and binding operations during tablet manufacture. However, there are no general references to such compositions in combination being disclosed for specifically improving foam stability and properties of fermented malt beverages.

SUMMARY OF THE INVENTION

It has now been found that the foam retention and lace/cling properties of a fermented malt beverage can be stabilized while minimizing haze formation by adding a combination of xanthan gum and cold-water soluble protein to the beverage in a combined amount sufficient to result in a final concentration in the beverage in the range of about 5–400 ppm, by weight. The proteins useful in the invention include, inter alia, collagen, gelatin, or milk protein hydrolysates, having a number average molecular weight of 900–12,000, which can be used in a weight ratio of 1:4 to 4:1 of xanthan gum/protein.

DETAILED DESCRIPTION OF THE INVENTION

The term "malt beverage," as used herein, includes such normal foam-forming fermented malt beverages as beer, ale, bock beer, stout, and the like.

By the term "xanthan gum", as used herein, is meant the extracellularly produced gum made by the heteropolysaccharide-producing bacterium *Xanthomonas campestris* by the whole culture fermentation under a variety of conditions of a medium comprising: a fermentable carbohydrate, a nitrogen source, and other appropriate nutrients. Examples, inter alia, of commercially available xanthan gums are KELTROL® T and KELTROL® F, available from Kelco Division of Merck & Co., Inc.

Processes for producing xanthan gum are well-known in the art, e.g., U.S. Pat. Nos. 4,316,012; 4,352,882; 4,375,512; 3,671,398; 3,433,708; 3,271,267; 3,594,280; 3,591,578; 3,391,061; 3,020,206; 3,481,889; 3,391,060; and UK Pat. No. 1,448,645.

A preferred form of xanthan gum utilized in the invention is one that has been clarified as by any of several known clarification processes. Clarified xanthan gums such as KELTROL® T and K5B143 (Kelco Division, Merck & Co., Inc.) are commercially available.

A clarified xanthan gum in one that has a 1% (wt./vol.) solution (deionized water) transmittance of not less than 85%, measured on a Bausch and Lomb Spectronic Model 21 (600 nm, 25° C., 10 mm cell).

By the term "cold-water soluble protein" as used herein is meant protein derived from the controlled hydrolysis of collagen, gelatin or milk protein and having a number average molecular weight, as determined by end-group analysis, in the range of about 900 to 12,000. Preferably, they have a weight of 4000 or less, especially 2000 or less. For convenience, the term "protein", as generally used herein, is meant to signify "cold-water soluble protein".

One example of an applicable cold-water soluble protein is that available commercially from Croda Food Ingredients, Ltd., England, and having an average molecular weight in the range of 1000–2000. It is available as Byco O or Crotein SPO. Following is a listing of the general properties of this preferred material.

| Properties | |
|---|---|
| Description | Spray, dried powder |
| Particle size | 20–50 microns |
| Bulk density | 0.3–0.5 g cc |
| Color | White |
| Odor | Bland |
| Taste | Bland in aqueous solution |
| Solubility | Soluble in cold water. Concentrations of 60% w/w readily attained. |
| Isoelectric point | pH 5.0–5.5 |
| Amino acid composition | |
| Amino acid | Grams of dry amino acids per 100 grams protein |
| Glycine | 20.9 |
| Alanine | 8.78 |
| Serine | 3.49 |
| Threonine | 1.88 |
| Proline | 13.79 |
| Hydroxyproline | 12.17 |
| Valine | 2.19 |
| Isoleucine | 1.48 |
| Leucine | 2.87 |
| Phenylalanine | 1.99 |
| Tyrosine | 0.26 |
| Tryptophan | — |
| Cystine | — |
| Cysteine | — |
| Methionine | 0.78 |
| Aspartic acid | 5.79 |
| Glutamic acid | 10.00 |
| Arginine | 7.89 |
| Histidine | 0.69 |
| Lysine | 3.94 |
| Hydroxylysine | 0.86 |

Additional useful proteins are the following milk protein hydrolysates available from New Zealand Milk Products, Inc., Petaluma, Calif.

| Product | Aver. Mol. Wt. |
|---|---|
| ALATAL 817 Hydrolyzed Lactalbumin | 1500 |
| Milk Protein Hydrolysate 5691 | 1500 |
| Milk Protein Hydrolysate 5690 | 1100 |
| Milk Protein Hydrolysate 5695 | 900 |

The invention comprises a process for improving the foam properties of a fermented malt beverage comprising adding to said beverage xanthan gum and a cold-water soluble protein, in a combined amount of about 5–400 ppm by weight of said beverage, preferably 40–100 ppm. Preferably, the gum and protein are added to raw fermentate prior to standard post-fermentation treatment such as chilling, filtering, and pasteurizing. Thus, an embodiment of this invention is a process for improving the foam properties of a fermented malt beverage comprising:

1. adding xanthan gum and cold-water soluble proteins to raw fermentate;
2. chilling said fermentate to 4.4° C.;
3. filtering said fermentate of step (2) with diatomaceous earth;
4. pasteurizing the fermentate of step (3) to 60° C. for 2 hours; and then
5. chilling the malt beverage to 4.4° C.

The invention also comprises a fermented malt beverage possessing improved foam properties containing xanthan gum and a cold-water soluble protein, in a combined amount of about 5–400 ppm by weight of said beverage, preferably 40–100 ppm.

The weight ratio of xanthan gum to protein used in the process is generally in the range of about 1:4 to 4:1 parts by weight, respectively, as a combined total, and preferably about 1:1 to 4:1 xanthan gum/protein.

In utilizing xanthan gum and cold-water soluble protein in treating a malt beverage in accordance with this invention, it is preferred to use a 0.5 to 1% aqueous solution of a mixture of the two components. The aqueous solution should be thoroughly mixed. This material should be added to the malt beverage after the fermentation step, and preferably, prior to filtering, shortly before the beverage is placed into the commercial container in which it is to be sold.

The process of the instant invention produces the subject composition of the invention which is a fermented malt beverage having acceptable foam properties, including desirable foam retention, lace, cling, and acceptable haze values.

The following example illustrates suitable methods of carrying out the invention and should not be regarded as being limiting:

EXAMPLE 1

FOAM AND PASTEURIZED HAZE TESTS

Bulk fermented malt beer samples containing about 3.5% alcohol by volume and 100 ppm by weight of the indicated xanthan gum/protein blend (or zero ppm in the case of the control) were "chilled" for 24 hours at 40° F. (4.4° C.).

The initial "haze" of each sample following the 24 hour "chill" at 4.4° C. was measured using a Coleman Nephelo-Colorimeter ® according to the general procedure recommended by the manufacturer and the results given in Nephelos units.

A haze reading of about 15–30 Nephelos units is in the "clear" category and below 15 is termed "brilliant".

The values are compared versus a control being the malt beverage excluding the presence of xanthan gum/protein combinations. Values of the control range from about 5 to 20 Nephelos units. Generally, values above 30 Nephelos units are considered unsatisfactory.

The xanthan gum/protein combinations were tested for foamibility according to the following procedure:

1. Test beer, 350 ml, was poured as a control or containing a xanthan gum/protein combination into a 1000 ml vacuum flask, decarbonated under reduced pressure, and brought to room temperature (24° to 25° C.). The gum/protein were added as a 1% aqueous solution calculated to result in a concentration of 100 ppm by weight in the beer. All glassware used in the procedure was rinsed overnight in chromic sulfuric acid cleaning solution, rinsed well with tap water and then deionized water, and dried at 100° C. before using in the foam test.
2. The beer was chilled to 4.4° C. and the initial haze value measured. The beer was pasteurized by heating to 60° C. and held at this temperature for 2 hours in a water bath. After the beer was again chilled to approximately 4.4° C., the pasteurized haze value was measured.
3. The pasteurized beer of step (2), 25 ml, was transferred into a clean, dry, 50 ml, glass stoppered, graduated cylinder and shaken vigorously for 15 seconds.
4. The treated beer was allowed to stand for 30 seconds. The total volume and liquid levels were read. As a measure of foam stability, the volume of foam (in ml) was calculated, as the difference between the total and liquid levels. Additional vales were again read after 5, 10, 15, 25 and 40 minutes and foam stability calculated.

The data of Table 1-1 were obtained.

TABLE 1-1

| SAMPLE | Time (min.) | Tot. (ml) | Liq. (ml) | Foam (ml) | Init. Haze | Past. Haze |
|---|---|---|---|---|---|---|
| Crotein SPO | 0.5 | 42 | 19 | 23 | | |
| | 5 | 41 | 23.25 | 17.75 | | |
| | 10 | 31 | 24 | 7 | 13 | 13 |
| | 15 | 29 | 24.25 | 4.75 | | |
| | 25 | 27 | 24.25 | 2.75 | | |
| | 40 | 25 | 25 | 0 | | |
| | 0.5 | 40 | 19 | 21 | | |
| | 5 | 39 | 23 | 16 | | |
| | 10 | 39 | 23 | 16 | | |
| | 15 | 31 | 23.5 | 7.5 | 13 | 13 |
| | 25 | 28 | 23.5 | 4.5 | | |
| | 40 | 25 | 24 | 1 | | |
| Keltrol T* | 0.5 | 48 | 13 | 35 | | |
| | 5 | 47 | 23 | 24 | 17 | 18 |
| | 10 | 46 | 23.25 | 22.75 | | |
| | 15 | 46 | 24 | 22 | | |
| | 25 | 45 | 24 | 21 | | |
| | 40 | 45 | 24 | 21 | | |
| Keltrol T | 0.5 | 43 | 17 | 26 | | |
| | 5 | 42 | 23 | 19 | | |
| | 10 | 42 | 23.25 | 18.75 | 17 | 18 |
| | 15 | 42 | 24 | 18 | | |
| | 25 | 42 | 24 | 18 | | |
| | 40 | 42 | 24 | 18 | | |
| Control | 0.5 | 41 | 18 | 23 | | |
| | 5 | 40 | 23 | 17 | | |
| | 10 | 39 | 24 | 15 | 15 | 18 |
| | 15 | 35 | 24 | 11 | | |
| | 25 | 31 | 24 | 7 | | |
| | 40 | 26 | 24.5 | 1.5 | | |
| | 0.5 | 39 | 21 | 18 | | |
| | 5 | 35 | 24 | 11 | | |
| | 10 | 33 | 24 | 9 | 15 | 18 |
| | 15 | 30 | 24 | 6 | | |
| | 25 | 28 | 24.5 | 3.5 | | |

TABLE 1-1-continued

| SAMPLE | Time (min.) | Tot. (ml) | Liq. (ml) | Foam (ml) | Init. Haze | Past. Haze |
|---|---|---|---|---|---|---|
| | 40 | 25 | 25 | 0 | | |
| Keltrol T/ | 0.5 | 47 | 14 | 33 | | |
| Crotein SPO | 5 | 46 | 22 | 24 | 18 | 19 |
| 4:1 | 10 | 46 | 23.5 | 22.5 | | |
| | 15 | 45 | 23.5 | 21.5 | | |
| | 25 | 44.5 | 24 | 20.5 | | |
| | 40 | 44.5 | 24 | 20.5 | | |
| | 0.5 | 45 | 18 | 27 | | |
| | 5 | 44 | 23 | 21 | | |
| | 10 | 44 | 23.5 | 20.5 | 18 | 19 |
| | 15 | 43 | 24 | 19 | | |
| | 25 | 42 | 24 | 18 | | |
| | 40 | 42 | 24 | 18 | | |

*Xanthan gum

EXAMPLE 2

Filtered Beer Tests

The effect of filtration on beer foam and haze was determined by adding xanthan gum/protein to beer samples and then filtering through diatomaceous earth. The following filtration procedure was used.

1. Slurry 4 g Johns Manville Celite 512 in 200 ml deionized water.
2. Pour the slurry onto a 841 Whatman filter paper and vacuum dry.
3. Slurry 2 g Celite in 300 ml freshly degassed beer (either the control, or 3 ml of a 1% gum/protein solution in 297 ml beer, i.e., a 100 ppm concentration).
4. Filter the beer/Celite slurry of step 3 through the precoated paper of step 2.

Using the procedure of Example 1, the filtered beer was then used to determine foam stability, haze, and pasteurized haze. The data of Tables 2-1 and 2-2 were obtained.

TABLE 2-1

| Sample | Time (min.) | Trial 1 Foam (ml) | Trial 2 Foam (ml) | Init. Haze | Past. Haze |
|---|---|---|---|---|---|
| Control | 0.5 | 26.5 | 30 | | |
| | 5 | 19.5 | 21 | | |
| | 10 | 17 | 16 | 17 | 17 |
| | 15 | 15.5 | 12 | | |
| | 25 | 11 | 9 | | |
| | 40 | 7 | 5 | | |
| Keltrol T/ | 0.5 | 27 | 28 | | |
| Crotein SPO | 5 | 20.5 | 22 | | |
| 4:1 | 10 | 19 | 20.5 | 21 | 23 |
| | 15 | 19 | 20.0 | | |
| | 25 | 19 | 19.5 | | |
| | 40 | 18.5 | 19.5 | | |
| Control | 0.5 | 29 | 30 | | |
| | 5 | 19 | 22 | | |
| | 10 | 18.5 | 19.5 | 17 | 19 |
| | 15 | 17 | 18 | | |
| | 25 | 12 | 16 | | |
| | 40 | 9.5 | 12 | | |
| Keltrol T/ | 0.5 | 29 | 31 | | |
| P.H.-5690* | 5 | 22 | 23.5 | | |
| 4:1 | 10 | 19 | 21 | 21 | 25 |
| | 15 | 19 | 21 | | |
| | 25 | 18 | 19 | | |
| | 40 | 18 | 19 | | |
| Keltrol T/ | 0.5 | 29 | 32 | | |
| P.H.-5695* | 5 | 21.5 | 22.5 | | |
| 4:1 | 10 | 20 | 21 | 20 | 25 |
| | 15 | 19 | 20.5 | | |
| | 25 | 17.5 | 20 | | |
| | 40 | 19.5 | 18.5 | | |
| Keltrol T/ | 0.5 | 29 | 33 | | |
| Alatal 817* | 5 | 22.5 | 22 | | |

TABLE 2-1-continued

| Sample | Time (min.) | Trial 1 Foam (ml) | Trial 2 Foam (ml) | Init. Haze | Past. Haze |
|---|---|---|---|---|---|
| 4:1 | 10 | 21 | 21 | | |
| | 15 | 20 | 21 | 23 | 27 |
| | 25 | 18.5 | 20 | | |
| | 40 | 18 | 21.5 | | |
| Keltrol T/ | 0.5 | 29 | 31 | | |
| P.H.-5691* | 5 | 22 | 22.5 | | |
| 4:1 | 10 | 22 | 22.5 | 20 | 25 |
| | 15 | 21 | 21 | | |
| | 25 | 19.5 | 20 | | |
| | 40 | 18.5 | 19.5 | | |

*Milk protein hydrolysate

What is claimed is:

1. A process for improving the foam properties of a fermented malt beverage comprising adding to said beverage xanthan gum and a cold-water soluble protein in a weight ratio in the range of about 4:1 to 1:4, in a combined amount of about 5–400 ppm by weight of said beverage.
2. The process of claim 1 wherein said cold-water soluble protein has a number average molecular weight of about 900–12,000.
3. The process of claim 2 wherein said cold-water soluble protein has a number average molecular weight of 4000 or less.
4. The process of claim 2 wherein said cold-water soluble protein has a number average molecular weight of 2000 or less.
5. The process of claim 1 wherein said xanthan gum is a clarified xanthan gum.
6. The process of claim 1 wherein said xanthan gum and protein are in a weight ratio in the range of about 4:1 to 1:1.
7. The process of claim 1 wherein said xanthan gum and protein are present in a combined amount of 40–100 ppm by weight based on said beverage.
8. The process of claim 1 wherein said malt beverage exhibits a haze value below 30 Nephelos units.
9. The process of claim 1 comprising:
    1. adding xanthan gum and cold-water soluble proteins to raw fermentate;
    2. chilling said fermentate to 4.4° C.;
    3. filtering said fermentate of step (2) with diatomaceous earth;
    4. pasteurizing the fermentate of step (3) to 60° C. for 2 hours; and then
    5. chilling the malt beverage to 4.4° C.
10. A fermented malt beverage possessing improved foam properties containing xanthan gum and a cold-water soluble protein in a weight ratio in the range of about 4:1 to 1:4 in a combined amount of 5–400 ppm by weight of said beverage.
11. The malt beverage of claim 10 wherein said protein has a number average molecular weight of about 900–12,000.
12. The malt beverage of claim 10 wherein said protein has a number average molecular weight of about 4000 or less.
13. The malt beverage of claim 11 wherein said protein has a number average molecular weight of 2000 or less.
14. The malt beverage of claim 10 wherein said xanthan gum is a clarified xanthan gum.

15. The malt beverage of claim 10 wherein said xanthan gum and protein are in a weight ratio of 4:1 to 1:1 respectively.

16. The malt beverage of claim 10 wherein said xanthan gum and protein are present in a combined amount of about 40–100 ppm by weight.

17. The malt beverage of claim 10 exhibiting a haze value of below 30 Nephelos units.

18. A fermented malt beverage of claim 10 containing a xanthan gum/cold-water soluble protein mixture, in a respective weight ratio of about 4:1, said mixture present in a combined amount of about 40–100 ppm by weight, and exhibiting a haze value of less than 30 Nephelos units.

* * * * *